United States Patent
Wu et al.

(10) Patent No.: US 10,775,900 B2
(45) Date of Patent: Sep. 15, 2020

(54) LIGHT GUIDE PLATE, THIN BACKLIGHT MODULE AND LUMINOUS KEYBOARD THEREOF

(71) Applicant: GLOBAL LIGHTING TECHNOLOGY INC., Taoyuan (TW)

(72) Inventors: Fan-Wei Wu, Taoyuan (TW); Chin-Hung Hsu, Taoyuan (TW)

(73) Assignee: GLOBAL LIGHTING TECHNOLOGY INC., Taoyuan (TW)

( * ) Notice: Subject to any disclaimer, the term of this patent is extended or adjusted under 35 U.S.C. 154(b) by 0 days.

(21) Appl. No.: 16/413,621

(22) Filed: May 16, 2019

(65) Prior Publication Data

US 2019/0369744 A1 Dec. 5, 2019

(30) Foreign Application Priority Data

May 29, 2018 (TW) .............................. 107118331 A

(51) Int. Cl.
   *G01D 11/28* (2006.01)
   *G06F 3/02* (2006.01)
   *F21V 8/00* (2006.01)

(52) U.S. Cl.
   CPC ......... *G06F 3/0202* (2013.01); *G02B 6/0035* (2013.01); *G02B 6/0051* (2013.01)

(58) Field of Classification Search
   CPC ........... H01H 13/7006; H01H 13/7013; G02B 6/0035; G02B 6/0051; G06F 3/0202
   See application file for complete search history.

(56) References Cited

U.S. PATENT DOCUMENTS

| | | | |
|---|---|---|---|
| 8,097,822 B2 | 1/2012 | Lee et al. | |
| 9,269,509 B2* | 2/2016 | Ho | ........................ H01H 3/125 |
| 9,449,772 B2 | 9/2016 | Leong et al. | |
| 2010/0111585 A1* | 5/2010 | Tsai | ..................... G06F 3/0202 400/472 |
| 2010/0148994 A1* | 6/2010 | Lin | ........................ H01H 13/83 341/22 |
| 2014/0168087 A1* | 6/2014 | Chen | ..................... G06F 3/0202 345/170 |

* cited by examiner

*Primary Examiner* — Matthew J. Peerce
(74) *Attorney, Agent, or Firm* — Fei-hung Yang

(57) ABSTRACT

A light guide plate provided for a luminous keyboard is disclosed. The light guide plate includes a main body, a first bump pair, a second bump pair, and many microstructure patterns. The main body has a light output surface and many press button installation areas defined thereon, each of the press button installation areas is arranged to fix a press key structure. The first bump pair and the second bump pair are integrally and seamlessly protruded from the main body. Each of the first bump pair has a first recess, and each of the second bump pair has a second recess. The first recess and the second recess are configured opposite to each other, and provided for assembling the press key structure. The microstructure patterns are formed next to the first and second bump pairs to abstract light by destructing the total reflection in the main body.

15 Claims, 10 Drawing Sheets

LIGHT GUIDE PLATE, THIN BACKLIGHT MODULE AND LUMINOUS KEYBOARD THEREOF

CROSS-REFERENCE TO RELATED APPLICATION

This application claims the priority benefit of Taiwan application serial no. 107118331, filed on May 29, 2018. The entirety of the above-mentioned patent application is hereby incorporated by reference herein and made a part of this specification.

BACKGROUND

Technical Field

The present disclosure generally relates to a backlight module. More particularly, the present disclosure relates to a light guide plate applied in a luminous keyboard.

Description of Related Art

As the light supply technology develops, various electronic products with a luminous effect are introduced to provide users a better using experience. For example, a keyboard being a main input device of desktop or notebook computers is a popular luminous electronic product. The early keyboard did not have the luminous effect, and later related manufacturers used a light supply structure as a light source and light up each press key during an operation, so as to achieve the prompting and decoration effects.

On the other hand, the electronic products tend to be developed with a light and thin design in recent years to meet the market requirements. The thickness of the aforementioned keyboard product, particularly a notebook computer keyboard, has a significant effect on the total thickness of the notebook computer. Therefore, it is a main subject for related manufactures to find a way to reduce the thickness of the keyboard effectively. In addition to the reduction of the thickness of the keyboard, it is also an important subject for the manufacturers to lower the cost of the product.

In the conventional luminous keyboard, the keycap is connected to the top terminal of the key leg, and the bottom terminal of the key leg is connected to a metal base. The electrical and optical components such as a backlight module and a thin film switch are installed between the metal base and the keycap. Since the metal base has a relatively large thickness, the thickness and weight of the luminous keyboard with the aforementioned structure are increased greatly, and related manufacturers have changed the design continuously to meet the market requirement for a thin and light design. The inventor of the present disclosure has previously filed U.S. Pat. No. 8,097,822 which discloses a method of using a light guide material to manufacture a circuit board directly or set a light guide film on the circuit board and omits the light guide plate of the conventional luminous key to save the thickness of the light guide plate, so as to reduce the total thickness of the press key structure effectively. By the method above, the assembling is more convenient, but the thickness of a relatively large position of the press key structure is occupied by the base, so that even the light guide plate is omitted, the total thickness of the keyboard still cannot be reduced to the expected thickness. Therefore, related manufacturers continued to make improvement in another direction, and U.S. Pat. No. 9,449,772 discloses a luminous keyboard with the conventional structure and uses a butterfly-type key switch rather than the traditional scissor-type key switch to achieve the effect of shortening the stroke of the press key and the butterfly-type key switch structure reduces the total thickness, but the structure requires a support structure (such as the base described above) to fix the butterfly-type key switch, and further worse that each press key is installed with a corresponding light guide component and a light source, so that more complex and cost are required for each press key of the keyboard to have the luminous effect.

Although U.S. Pat. No. 8,097,822 filed by the applicant can reduce the total thickness by the method of omitting the light guide plate structure, yet the total thickness still cannot be reduced to a desired value due to the limitation of the base. Furthermore, the light output performance is affected significantly without the light guide plate structure. Although U.S. Pat. No. 9,449,772 adopts the butterfly-type switch structure to reduce the thickness, each press key needs to have a light guide component and a light source, and thus incurring a higher cost of the product and requiring to assemble the press keys one by one in an assembling operation, and wasting much time and lowering the yield rate.

SUMMARY

In view of the aforementioned drawbacks of the prior art, the inventor of the present disclosure discloses a light guide plate, a thin backlight module and a thin luminous keyboard with a design that breaks through the conventional design of the luminous keyboard, not just reducing the total thickness effectively only, but also having the advantage of simple, easy and quick assembling and providing an excellent luminous effect.

An aspect of the disclosure is to provide a light guide plate having mechanical structures thereon to pivotally connect many key structures of a keyboard.

According to one embodiment of the aspect, the light guide plate includes a main body, a first bump pair, a second bump pair, and many microstructure patterns. The main body has a light output surface and many press button installation areas defined thereon, each of the press button installation areas is arranged to fix a press key structure. The first bump pair and the second bump pair are integrally and seamlessly protruded from the main body. Each of the first bump pair has a first recess, and each of the second bump pair has a second recess. The first recess and the second recess are configured opposite to each other, and provided for assembling the press key structure. The microstructure patterns are formed next to the first and second bump pairs to abstract light by destructing the total reflection in the main body. Therefore, the light guide plate with protruded bumps replaces the metal base of the keyboard to connect the bottom terminal of each key leg, and thus the thickness of the base can be reduced.

In one embodiment, the first recess is formed by a first heightening portion and a first combining portion, and the second recess is formed by a second heightening portion and a second combining portion. For instance, the heightening portion is formed above the light output surface, and the combining portion is formed above the heightening portion. And thus the key leg of the key structure can be pivotally moved in the niche space defined by the heightening portions as the lateral wall.

Another aspect of the disclosure is to provide a thin backlight module, and the thin backlight module is operated with many press key structures and to be applied in a luminous keyboard.

According to one embodiment of the aspect, the thin backlight module includes a light guide plate and at least one LED light source. The light guide plate is applied to fix many press key structures. In detail, the light guide plate has a light output surface, many first bumps and second bumps, and many microstructure patterns. The light output surface has many press button installation areas defined thereon, and the press button installation areas are alternatively correspond to the press key structures. Each of the press button installation area has at least two of the first bumps, at least two of the second bumps and at least four of the microstructure patterns. The at least two first bumps and two second bumps are configured opposite to each other for assembling one of the corresponding press key structures via the first recess on the first bump and the second recess on the second bump.

The light provided by the LED light source enters into the light guide plate. The microstructure patterns destruct the total reflection of the light and thus output the light at the press button installation area.

Wherein, the first bumps and second bumps are integrally formed on the light guide plate. And therefore, the light guide plate of the thin backlight module replaces the mechanical connecting function of the metal base.

In one embodiment, the thin backlight module further includes a mask piece being installed at the top side of the light guide plate. The mask piece includes a diffusion type reflector body and a light shielding layer. The diffusion type reflector body has many mounting holes configured to be corresponsive to the press button installation areas respectively. The light shielding layer is coated onto the upper surface of the diffusion type reflector body, and a blank area is formed and included between the light shielding layer and each of the mounting holes. Wherein, each of the blank area has a light transmitting property to form a uniform bright circle around the keycap at the top of the press key structure. And thus, the luminous effect is also improved.

Additionally, in another embodiment, the blank area is designed in a square shape to match each key of the keyboard, and the frame width of the square shape is 0.85 mm-1.15 mm. In still another embodiment, the diffusion type reflector body is a white reflector having a thickness of 0.02-0.05 mm. In the other embodiment, the light shielding layer is a black ink coating.

The other aspect of the disclosure is to provide a thin luminous keyboard with thinner total thickness, less complex structure for assembly and gentle luminous effect to overcome the drawbacks of the prior.

According to one embodiment of the aspect, the thin luminous keyboard includes a thin backlight module, many press key structures and keycaps, and a bottom plate. The thin backlight module includes a light guide plate and at least one LED light source. The light guide plate has a light output surface, many first bumps and second bumps, and many microstructure patterns. The light output surface has many press button installation areas defined thereon. Each of the press button installation areas has at least two of the first bumps, at least two of the second bumps and at least four of the microstructure patterns. The at least two first bumps and two second bumps are configured opposite to each other, and the first and second bumps are integrally formed on the light guide plate.

The LED light source is applied to provide the light into the light guide plate, and the light is abstracted to the press button installation areas by destructing the total reflection via the microstructure patterns. The press key structures are configured to be corresponsive to the press button installation areas, and the press key structures are installed on the light guide plate by articulating with the first recesses of the first bumps and the second recesses of the second bumps. The keycaps are coupled to the top ends of the press key structures. The bottom plate is installed to the bottom side of the thin backlight module.

In one embodiment, the press key structure has a first main body and a second main body, the first main body and the second main body are pivotally coupled to each other. The press key structure has a hollow area enclosed and formed at the center of the press key structure, and several first columns are formed on the first main body for assembling the first bump, and several second columns are formed on the second main body for assembling the second bump. In other words, the first main body and the second main body have many first connecting columns and second connecting columns configured to be corresponsive to a side of the hollow area, and the first connecting columns are provided to be installed with the first bumps, and the second connecting columns are provided to be installed with the second bumps.

In summation, the thin backlight module and the thin luminous keyboard of the present disclosure omits components such as a metal base used for supporting in the prior art, so that the press key structure can be installed directly onto the light guide plate for providing light, so as to reduce the total thickness significantly. In the meantime, the assembling process can be simplified effectively and the costs of the product can be lowered. The technical characteristic of using the light guide plate for assembling the press key structure is obviously different from the prior and moves away from the past intuitive development direction to omit the structure of the support element while maintaining the effects of providing light and installing the press key structure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
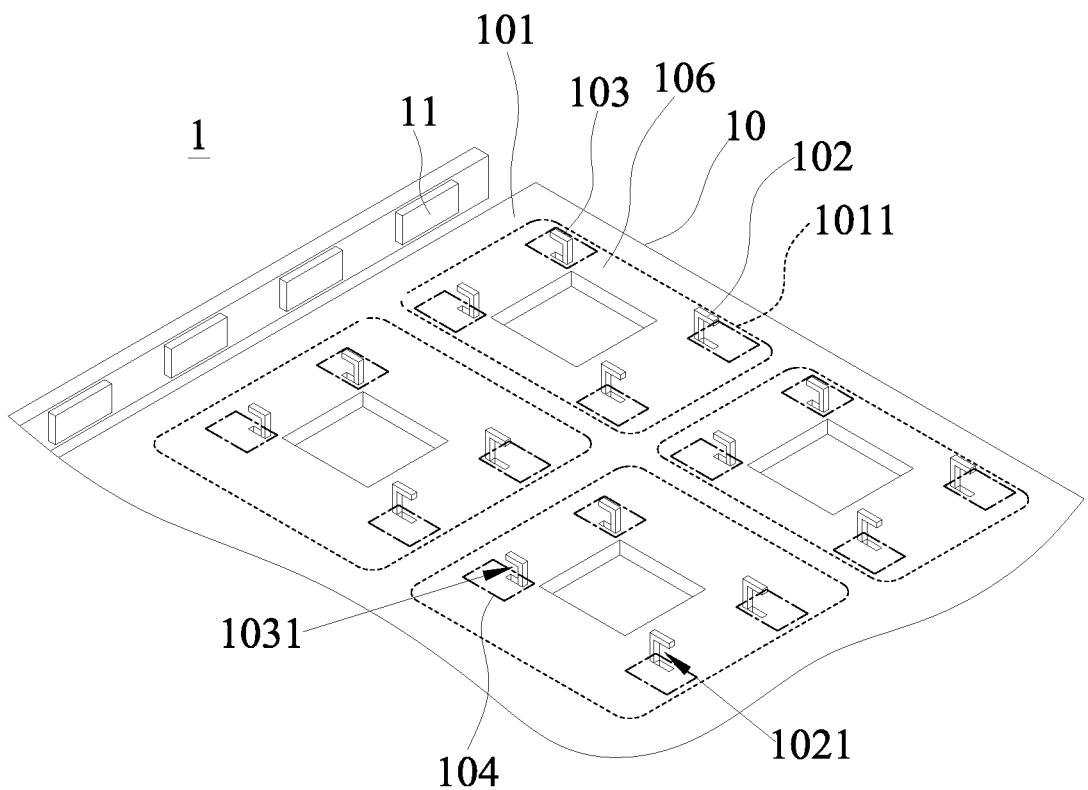
FIG. 1 is a partial schematic view of a thin backlight module in accordance with a first implementation mode of an embodiment of the disclosure.
Figure 2:
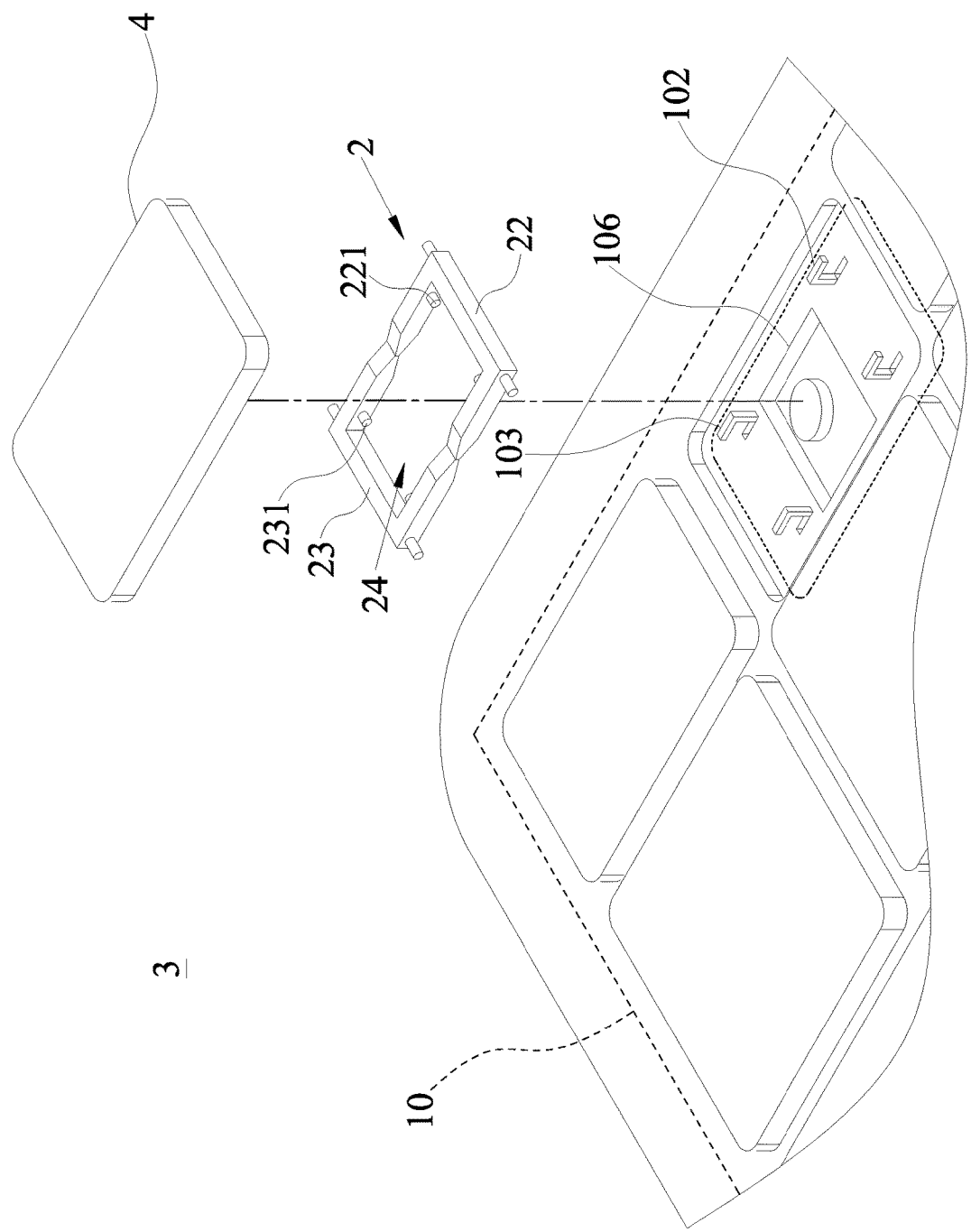
FIG. 2 is a partial exploded view of a thin luminous keyboard in accordance with the first implementation mode of an embodiment of the disclosure.
Figure 3A:
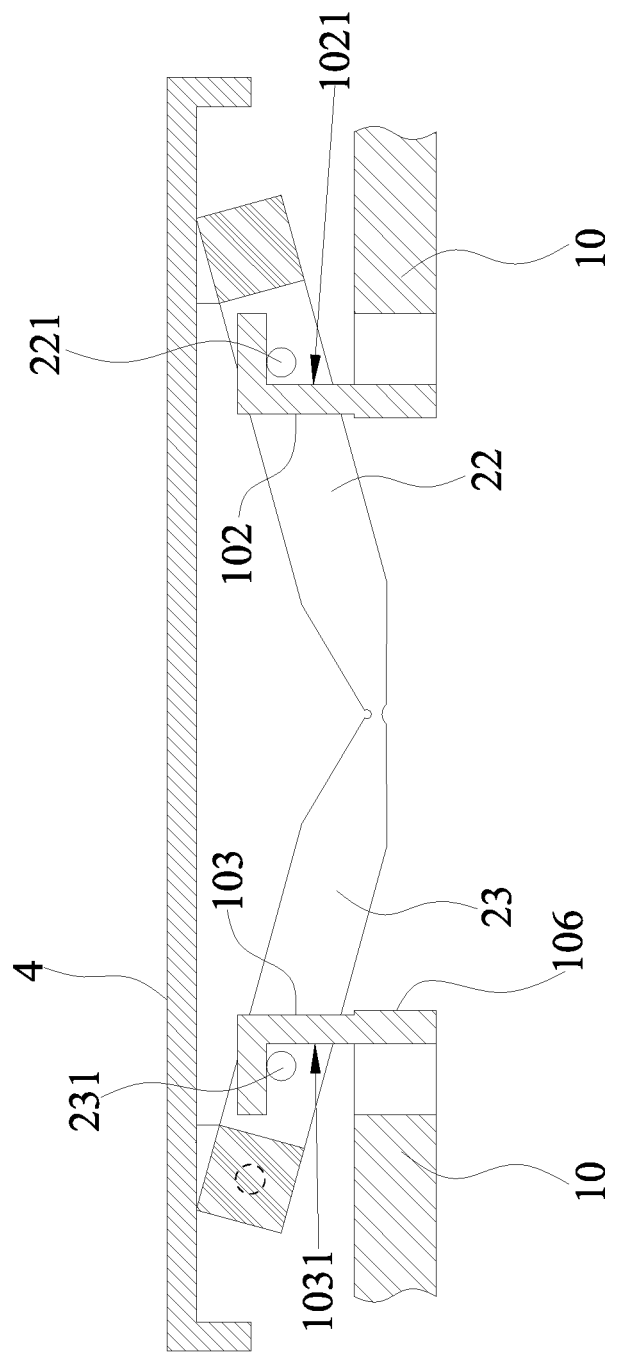
FIG. 3A is a first cross-sectional view of assembling a thin luminous keyboard in accordance with the first implementation mode of an embodiment of the disclosure.
Figure 3B:
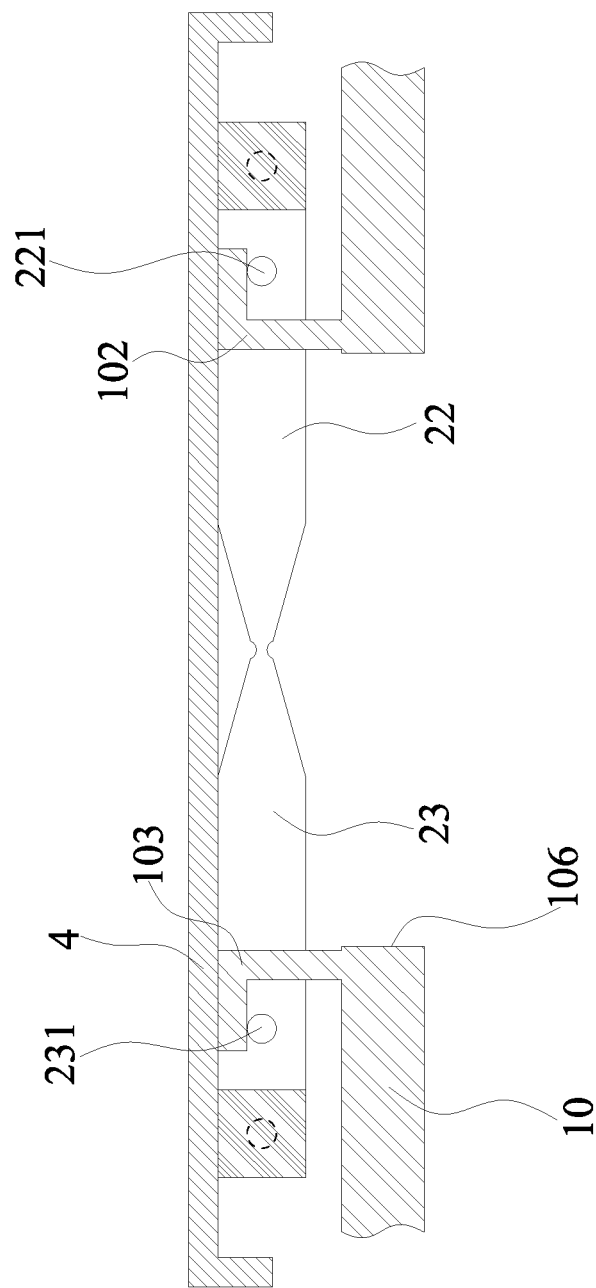
FIG. 3B is a second cross-sectional view of assembling a thin luminous keyboard in accordance with the first implementation mode of an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

With reference to FIGS. 1-3B for a partial schematic view of a thin backlight module, a partial exploded view of a thin luminous keyboard, and cross-sectional views of assembling a thin luminous keyboard in accordance with a first implementation mode of one embodiment of the present disclosure respectively, the present disclosure discloses a thin backlight module 1 and a thin luminous keyboard 3. The thin luminous keyboard 3 comprises a thin backlight module 1, a plurality of press key structures 2, a plurality of keycaps 4 and a bottom plate 5, and the thin backlight module 1 is operated together with the press key structure 2 and applied in the thin luminous keyboard 1. The thin backlight module 1 comprises a light guide plate 10 and at least one LED light source 11. The light guide plate 10 is provided for fixing the press key structure 2 and has a light output surface 101, a plurality of first bumps 102, a plurality of second bumps 103 and a plurality of microstructure patterns 104, and the light output surface 101 has a plurality of press button installation areas 1011 defined thereon, and each press button installation area 1011 has the plurality of first bumps 102, the plurality of second bumps 103 and at least one microstructure pattern 104, and the plurality of first bumps 102 and the plurality of second bumps 103 are configured to be opposite to each other and provided for assembling with the press key structure 2, and the first bump 102 and the second bump 103 are integrally formed on the light guide plate 10. For instance, the first bump 103 and the second bump 104 are made of plastic such as PMMA concurrently having the optical properties and the required structural rigidity. The LED light source 11 is for providing light to enter into the light guide plate 10, destructing the total reflection of the light by the microstructure pattern 104, and outputting light in the press button installation area 1011. Wherein, the microstructure pattern 104 is a small dot structure and configured according to the desired luminous status. The microstructure pattern 104 as shown in FIG. 1 is provided for illustrating this disclosure only, but not intended for representing the actual form of the microstructure pattern 104. The thin backlight module 1 can be fixed with the press key structure 2 through the light guide plate 10, so that each press button installation area 1011 has the light outputting effect, and an additional component such as a metal base, a support structure or a metal plate required for fixing and used in the prior art can be omitted, and such components leads to a greater total thickness and a higher manufacturing cost. In addition, the thin backlight module 1 of this embodiment is applied to the luminous keyboard to achieve the effect of installing a plurality of press key structures 2 on a single light guide plate 10 simultaneously without the need of aligning the single press key structure 2 precisely with the single light guide plate, so as to overcome the difficulty of the manufacture effectively. To simplify the illustration of the structure of the thin backlight module 1, the microstructure pattern 104 is represented by a dotted rectangle as shown in FIG. 1, but the actual microstructure pattern 104 refers to a dot structure disposed on the light guide plate 10, and the distribution area and the density of the microstructure patterns 104 may be adjusted according to the required luminous effect of each press key press button corresponding to each respective installation area 1011. It is noteworthy that the microstructure patterns 104 as shown in FIG. 1 are provided for the purpose of illustration only.

For instance, the LED light source 11 is in form of a lamp string and configured to be corresponsive to a side of the light guide plate 10 to form a side-lit light with respect to the light guide plate 10, so as to achieve a structure with a smaller thickness. In this embodiment, the LED light source 11 is arranged on the short side of the light guide plate 10. The press key structures 2 are configured to be corresponsive to the press button installation areas 1011 respectively and installed on the light guide plate 10, and the bottom end of the press key structure 2 is provided for assembling with the plurality of first bumps 102 and the plurality of second bumps 103. The keycap 4 is coupled to the top end of the press key structure 2, wherein a part of or the whole region has the light transmission effect, so as to provide a luminous effect, and the bottom plate 5 is installed to the bottom side of the thin backlight module 1. When pressed, the press key structure 2 receives a force to move downward; and when not pressed, the press key structure 2 restores its original state to support the keycap 4.

Unlike the prior art, the thin backlight module 1 of the present disclosure uses the first bump 102 and the second bump 103 integrally formed on the light guide plate 10 to fix the press key structure 2 directly on the light guide plate 10 with the lighting effect, and this technique omits an additional installation of a base, a support structure or a metal plate for supporting and fixing the press key structure component, and breaks through the present existing technical know-hows of the design in the related field. To reduce the total thickness effectively, the conventional luminous keyboard made improvements and changes to the press key structure or the circuit board, and these improvements and changes are designed in the assembled mode of the conventional press key structure, but the present disclosure moves away from the thinking of the past designs and omits the support component, so that the press key structure 2 is installed directly onto the light guide plate 10 to decrease the thickness of the structure by omitting the support component that occupies most of the thickness. As a result, the total thickness can be smaller than the conventional structure, and the press key structure 2 can be supported and fixed at the time. The thin backlight module 1 of the present disclosure omits the technical characteristics of the prior at, while achieving the effects of guiding and outputting light, and supporting the press key structure 2. The disclosure breaks through the conventional technical know-hows and differs from the conventional design direction of the related field to disclose the aforementioned technical characteristics of the present disclosure.

By the method of installing the press key structure 2 onto the light guide plate 10 directly, the luminous keyboard can decrease the total thickness greatly and reduce the manufacturing time and the cost of the product. In other words, the thin luminous keyboard 3 omits the materials or components previously used for fixing the press key structure and uses the light guide plate 10 to achieve the effects of fixing the press key structure 2 and guiding and outputting light, so as to effectively decrease the thickness of the thin backlight module 1 occupied in the thin luminous keyboard 3, so as to reduce the structural thickness of the whole thin luminous keyboard 3. The present disclosure omits the support structure or metal plate to decrease the total thickness of the thin luminous keyboard 3, so that the total thickness is smaller than the total length of the conventional structure. This design is a technical improvement over the conventional ways that just make improvement on the press key structure 2 or the electrical structure only, and this disclosure breaks through the present existing technical know-hows and meets the current market requirements for a thin product.

In practical applications a reflector (not shown in the figure) is additionally installed between the bottom plate 5 and the thin backlight module 1 to reflect any light spilling out of the bottom side of the light guide plate 10 back into the light guide plate 10 for further use, and reduce the loss of light energy. Related electrical structures and elastic members for providing an elastic restoring force to the keycap 4 can be installed under the keycap 4, but these structures have been used for long in the related industry, and thus will not be described here.

In this embodiment, the press key structure 2 is a V-shaped or scissor structure. The press key structure 2 has a first main body 22 and a second main body 23 pivotally coupled to each other, and the center of the press key structure 2 is enclosed to form a hollow area 24, and a side of the first main body 22 and side of the second main body 23 corresponding to the hollow area 24 have a plurality of first connecting columns 221 and a plurality of second connecting columns 231 respectively, and the first connecting column 221 is provided for assembling with the first bump 102, and the second connecting column 231 is provided for assembling with the second bump 103. For instance, the first bump 102 has a first recess 1021, and the second bump 103 has a second recess 1031 to form an inverted L-shape. When the press key structure 2 is mounted, both ends are moving end and are pivot areas for receiving the first main body 22 and the second main body 23, so as to prevent the press key structure 2 and the light guide plate 10 from interfering with each other, and prevent shading other components such as an elastic restoring element (which is a metal dome or a rubber dome) of the thin luminous keyboard 3, and there may be a broken hole 106 formed between the plurality of first bumps 102 and second bumps 103 in each press button installation area 1011 as shown in FIG. 1. When the press key structure 2 is installed to the light guide plate 10, the first connecting columns 221 and the second connecting columns 231 are configured to be corresponsive to the first bumps 102 and the second bumps 103 respectively. If the press key structure 2 is not pressed, the region where the first main body 22 and the second main body 23 are pivotally coupled to each other will be situated in the broken hole 106. If the press key structure 2 is pressed, the press key structure 2 will be deformed into a substantially flat sheet form. Now, the region where the first main body 22 and the second main body 23 pivotally coupled to each other will leave the broken hole 106. When the press key structure 2 returns to its originally not pressed state, the region where the first main body 22 and the second main body 23 pivotally coupled to each other will return its position into the broken hole 106.

It is noteworthy that the light guide plate 10 is manufactured by an injection molding method, so that the first bump 102 and the second bump 103 are integrally formed on the light guide plate 10, and the light guide plate 10 is made of a material such as PMMA with appropriate rigidity and light transmission. To form the first recess 1021 and the second recess 1031 of the first bump 102 and the second bump 103, a shut off method is used for the manufacture in the injection molding process, so that the region of the finally formed light guide plate 10 adjacent to each first bump 102 and each second bump 103 will be next to the broken hole. In a specific implementation, an ejector is passed separately to the positions corresponding to the first bump 102 and the second bump 103 in the mold and then removed after the whole structure is molded. Therefore, the first bump 102 and the second bump 103 have a first recess 1021 and a second recess 1031 formed thereon respectively, and the recesses are formed by the ejectors. This arrangement is conducive to the control of product yield rate and the replacement of the mold. Of course, this embodiment is for instance, and tabs may be installed at positions corresponding to the injection molding mold (which is inside a lower mold of the present disclosure), so that the light guide plate 10 formed after the injection molding process has the first recess 1021 and the second recess 1031 formed at the corresponding positions of the tabs, and finally the product is manufactured after demolding.

Figure 4:
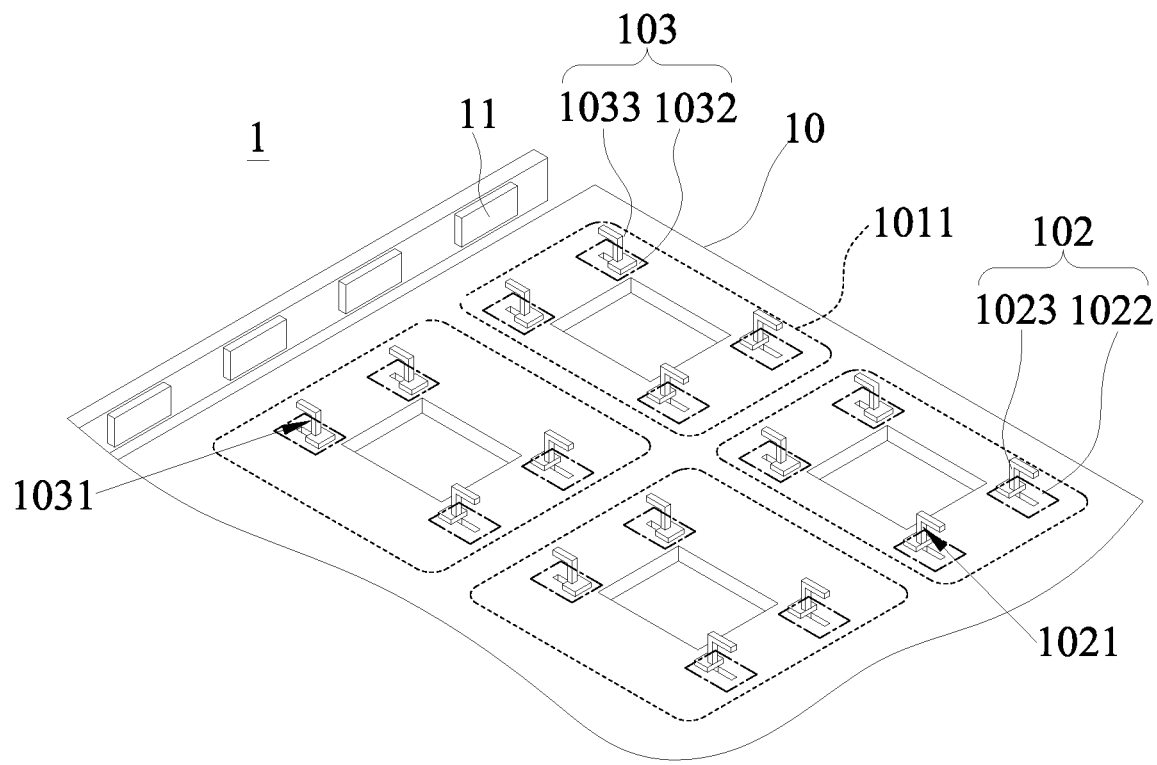
FIG. 4 is a partial schematic view of a thin backlight module in accordance with a second implementation mode of an embodiment of the disclosure.
Figure 5A:
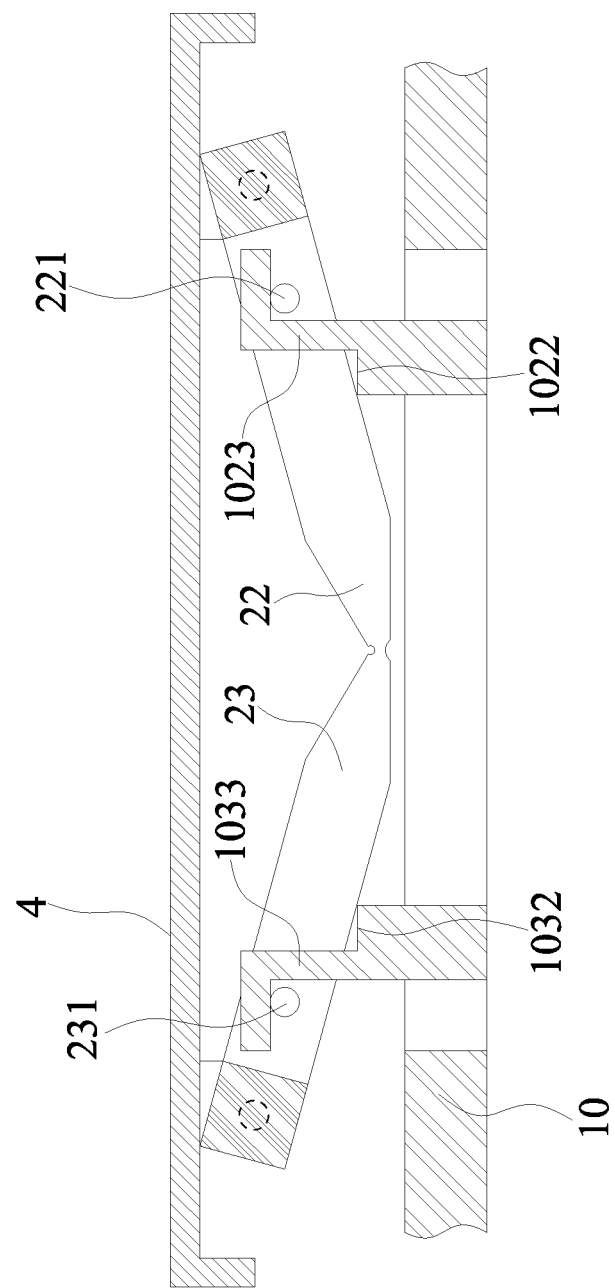
FIG. 5A is a first cross-sectional view of assembling a thin luminous keyboard in accordance with the second implementation mode of an embodiment of the disclosure.
Figure 5B:
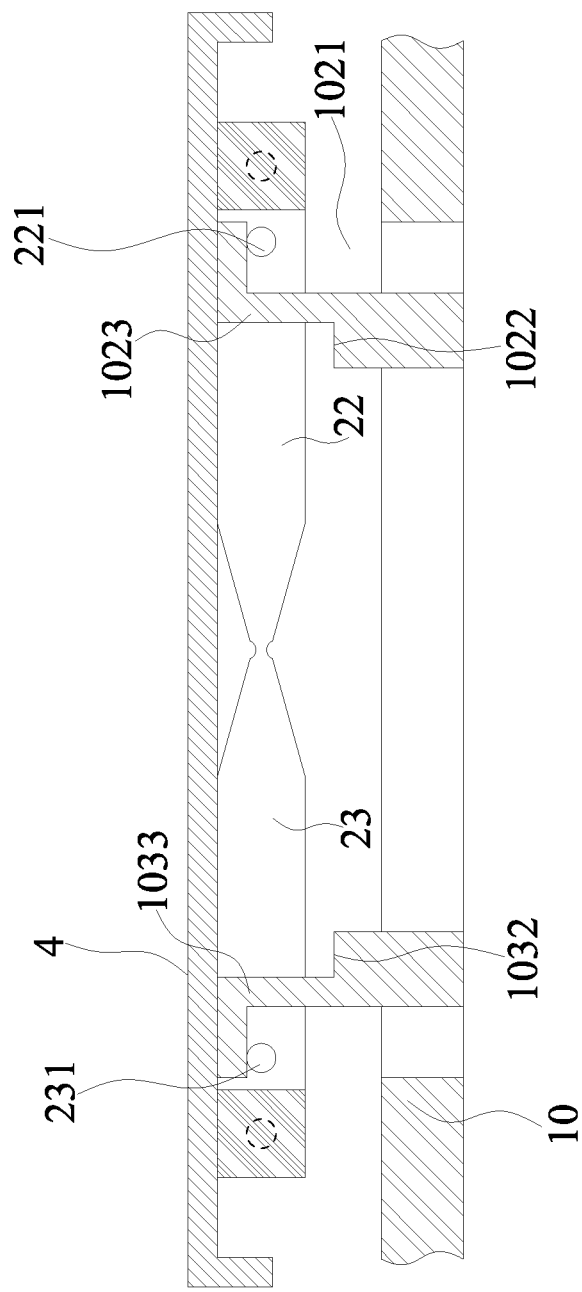
FIG. 5B is a second cross-sectional view of assembling a thin luminous keyboard in accordance with the second implementation mode of an embodiment of the disclosure.

With reference to FIGS. 4-5B for partial schematic views of a thin backlight module and partial cross-sectional views of assembling a thin luminous keyboard in accordance with a second implementation mode of an embodiment of the present disclosure respectively, the light guide plate 10 of this implementation mode is at the following structural state, and each first bump 102 has a first heightening portion 1022 and a first combining portion 1023, and each second bump 103 has a second heightening portion 1032 and a second combining portion 1033, and each first combining portion 1023 is disposed on each respective first heightening portion 1022, and each second combining portion 1033 is disposed on each respective second heightening portion 1032. In this implementation mode, each first combining portion 1023 has a first recess 1021 and each second combining portion 1033 has a second recess 1031 to form an inverted L-shape. When the press key structure 2 is assembled to the light guide plate 10, each of the first connecting columns 221 and second connecting columns 231 disposed on the press key structure 2 is fixed to the respective first combining portion 1023 and second combining portion 1033. Since the light guide plate 10 has the first heightening portion 1022 and the second heightening portion 1032, therefore the press key structure 2 installed on the light guide plate 10 will not interfere with the light guide plate 10 when the press key structure 2 is not pressed. When the press key structure 2 is pressed, a substantially flat sheet shape will be formed. Similarly, when the light guide plate 10 is manufactured by the injection molding process, the shut off method is also used to form the first recess 1021 and the second recess 1031 on the first bump 102 and the second bump 103 respectively as shown in the figure, and the region of the first bump 102 and the second bump 103 adjacent to the light guide plate 10 has broken holes. The specific implementation of the shut off process is the same as described above, and thus will not be repeated.

Figure 6:
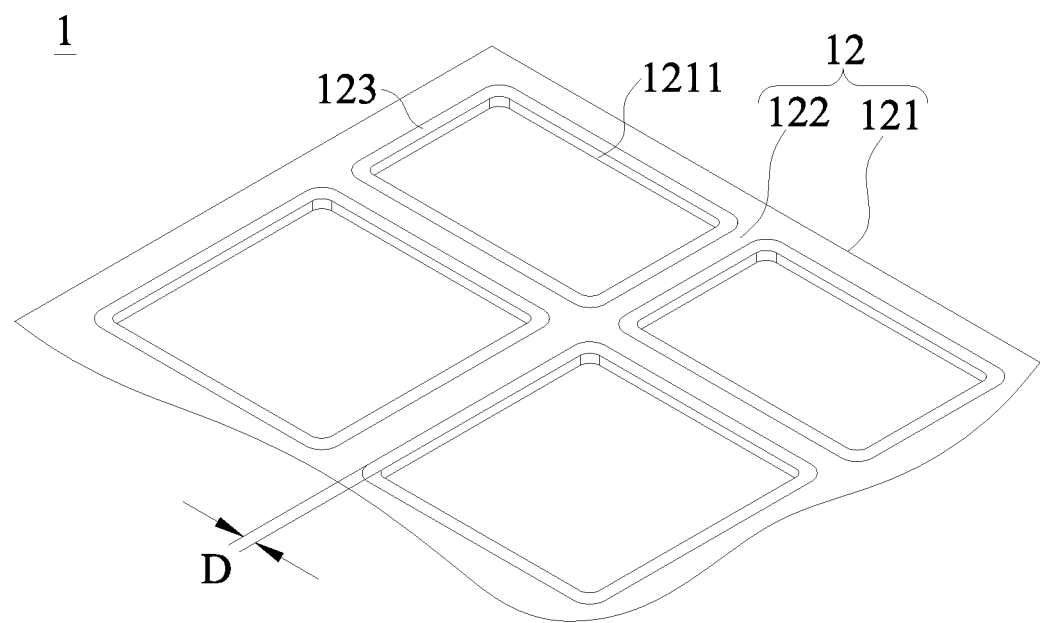
FIG. 6 is a partial exploded view of a thin backlight module in accordance with a third implementation mode of an embodiment of the disclosure.
Figure 6:
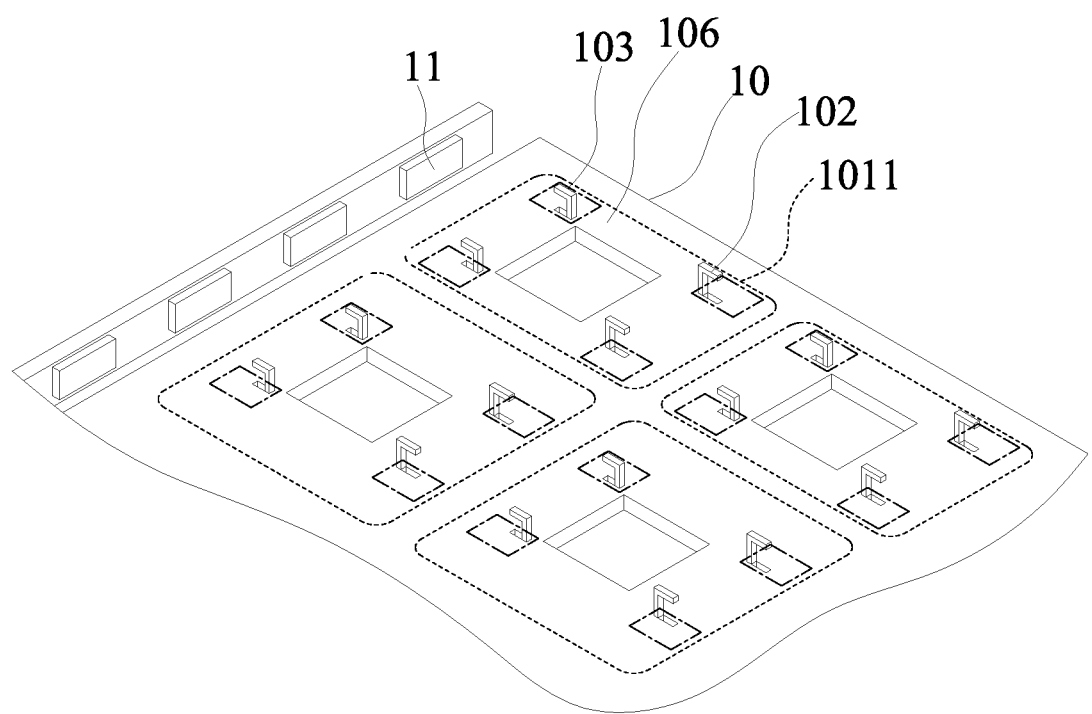
Figure 7:
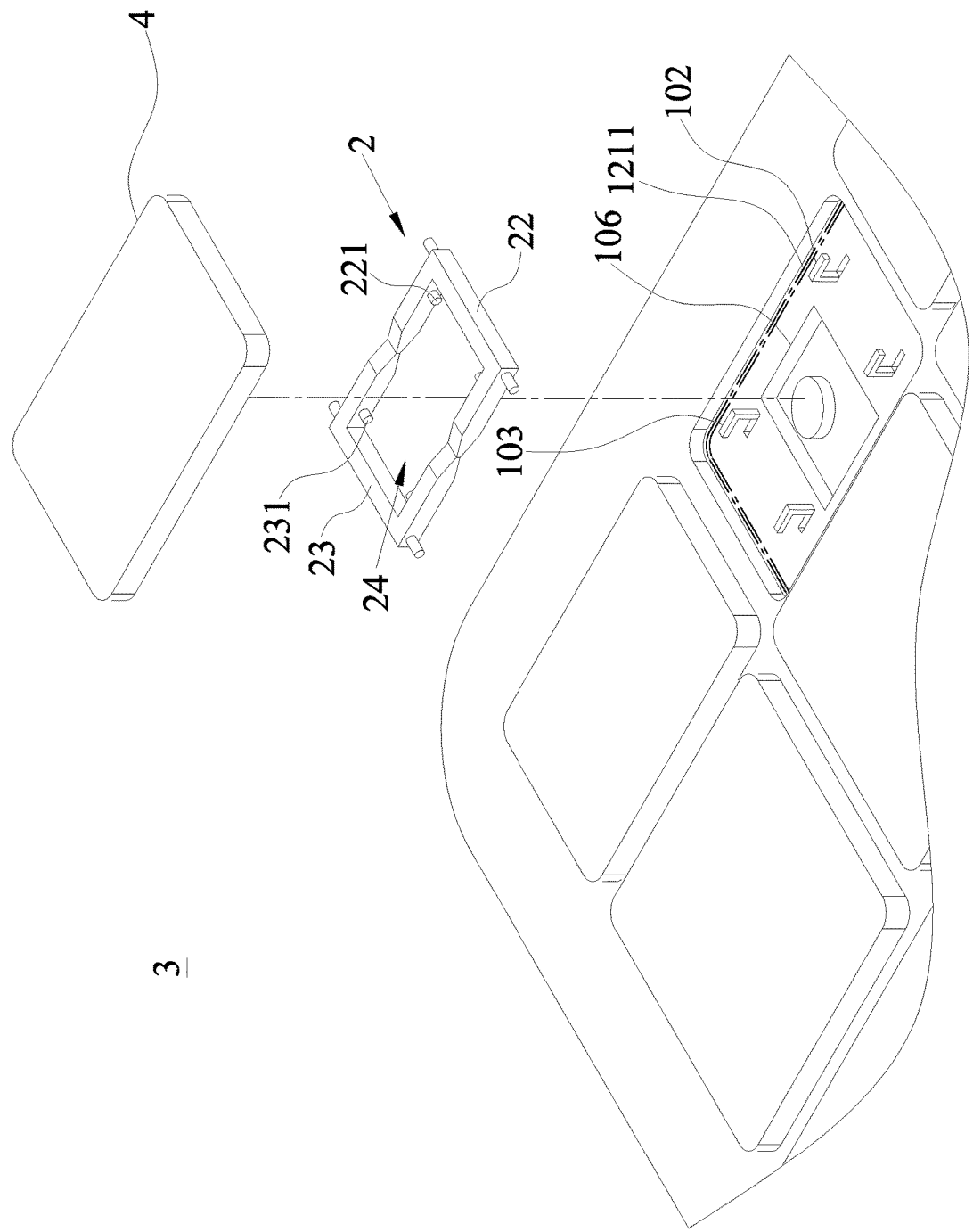
FIG. 7 is a partial exploded view of a thin luminous keyboard in accordance with the third implementation mode of an embodiment of the disclosure.
Figure 8:
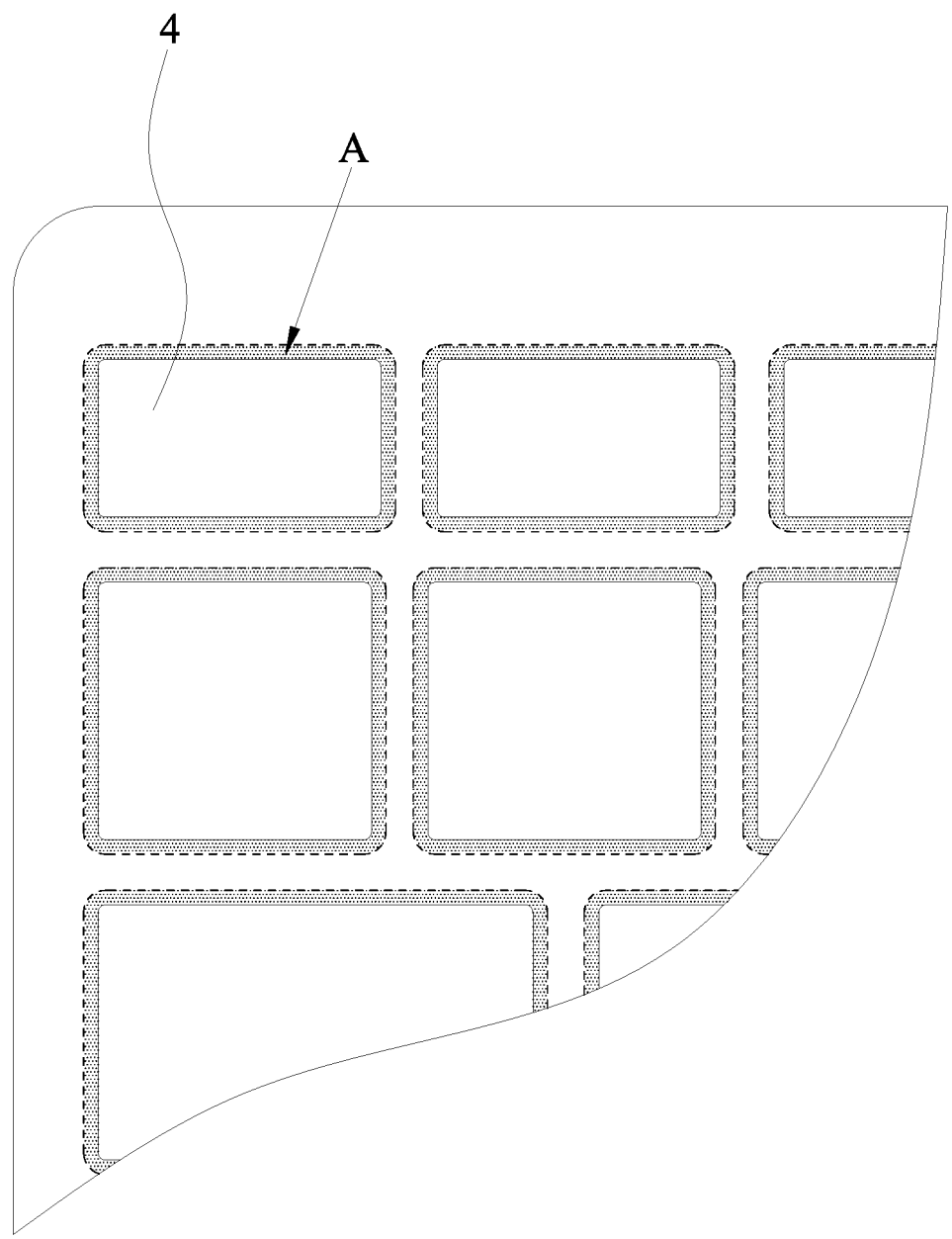
FIG. 8 is a schematic view of a thin luminous keyboard producing a uniform bright ring in accordance with the third implementation mode of an embodiment of the disclosure.

With reference to FIGS. 6 to 8 for a partial exploded view of a thin backlight module, a partial exploded view of a thin luminous keyboard, and a schematic view of producing a uniform bright ring in the thin luminous keyboard in accordance with the third implementation mode of an embodiment of the present disclosure respectively, the thin backlight module 1 further comprises a mask piece 12 installed at the top side of the light guide plate 10, and the mask piece 12 comprises a diffusion type reflector body 121 and a light shielding layer 122, wherein the diffusion type reflector body 121 is a thin-film structure and has a plurality of mounting holes 1211, and the mounting holes 1211 are configured to be corresponsive to the press button installation areas 1011 respectively and provided for passing the press key structure 2 or passing the first bump 102 and the second bump 103; a light shielding layer 122 coated onto an upper surface of the diffusion type reflector body 121, and a blank area 123 is formed and included between the light shielding layer 122 and an edge of each mounting hole 1211, wherein the blank area 123 has the light transmitting property capable of forming a uniform bright circle A around the keycap 4 installed on the press key structure 2. When light passing through the mounting hole 1211 of the mask structure 12 is provided to each keycap 4, each blank area 123 with the light transmitting property will have a uniform bright circle A formed around the keycap 4 by the diffusion and light transmission characteristics. After the light is removed, the light emitting from the mounting hole 1211 leaks in a large angle, and cause hot spots with non-uniform brightness, and the light shielding layer 122 can prevent the light from being outputted from unexpected regions and avoid affecting the light performance and causing a loss of light energy. It is noteworthy that the mask piece 12 can form the uniform bright circle A because the diffusion type reflector body 121 is a thin-film structure having a light transmission characteristic, and the diffusion characteristic of the diffusion type reflector can diffuse the bright spot reflected from the keycap 4, so that after the mask piece 12 receives the light, the blank area 123 shows the uniform bright circle A around the keycap 4, wherein the mask piece 12 shown in the figure is intended for illustrating the disclosure only, but not representing the actual size. Actually, the mask piece 12 is the thin-film structure as described above.

In this implementation mode, the diffusion type reflector body 121 of the mask piece 12 is a white reflector with a thickness of 0.02-0.05 mm and having both light diffusion and transmission effects, so that the bright ring can be formed more uniformly and beautifully. In practical applications, the diffusion type reflector body 121 may be the white reflector with a model number SW83G and manufactured by SKC® Company, and a light shielding layer 122 is coated onto the upper surface of the white reflector to form the mask piece 12. Each blank area 123 is in a square shape, and each blank area 123 has a frame width D falling within a range of 0.85 mm-1.15 mm in order to improve the side glare and form a uniform bright circle A around the keycap 4. In this embodiment, the frame width D of each blank area 123 is 1 mm in order to achieve the luminous effect with good brightness and uniformity of the bright rings.

To ensure the light shading performance of the light shielding layer 122, a dark ink is coated onto the diffusion type reflector body 121 to form the light shielding layer 122, wherein the dark ink is a black, grey or brown ink. In this embodiment, the light shielding layer 122 is a black ink coating.

In summation of the description above, the thin backlight module and the thin luminous keyboard of the present disclosure have the first bump and the second bump integrally formed on the light guide plate, so that the press key structure can be fixed to the light guide plate directly without requiring an additional metal base for installing the press key structure to reduce the total thickness significantly and meets the current market requirements for a light and thin product. In the meantime, the assembling process can be simplified effectively, and the cost of the product can be lowered, and an excellent uniform light can be outputted. The technical characteristic of using the light guide plate for assembling the press key structure is obviously different from the prior art and breaks through the existing technical know-how in the related field and moves away from the past intuitive development direction to omit the structure of the support element while maintaining the effects of providing light and installing the press key structure. In other words, the present disclosure builds a novel technical structure on the present existing luminous keyboard and integrally forms the structure for assembling the press key structure and the keycap onto the light guide plate directly to omit the metal base or omit the bumps of the metal base for installing the press key structure and the keycap to obtain a very thin sheet structure, so as to effectively reduce the total thickness of the lighting module and the luminous keyboard and avoiding the inconvenient and laborious assembling process.

What is claimed is:

1. A light guide plate, provided for a luminous keyboard, comprising:
a main body, having a light output surface and a plurality of press button installation areas defined thereon, each of said plurality of press button installation areas arranged to fix a press key structure;
a first bump pair and a second bump pair, integrally and seamlessly protruded from said main body, each of said first bump pair having a first recess, and each of said second bump pair having a second recess, said first recess and said second recess configured opposite to each other and provided for assembling said press key structure; and
a plurality of microstructure patterns formed next to said first bump pair and said second bump pair, for abstracting light by destructing the total reflection in said main body,
wherein at least one LED light source is arranged on a short side of said light guide plate such that said light guide plate receives light emitted by said LED light source and distribute light across said press button installation area.

2. The light guide plate of claim 1, wherein said first recess is formed by a first heightening portion and a first combining portion, and said second recess is formed by a second heightening portion and a second combining portion.

3. A thin backlight module, provided for operating with a plurality of press key structures and applied in a luminous keyboard, comprising:
a light guide plate for fixing said plurality of press key structures, and having a light output surface, a plurality of first bumps, a plurality of second bumps and a plurality of microstructure patterns, wherein said light output surface has a plurality of press button installation areas defined thereon and alternatively correspond to said plurality of press key structures, and each of said plurality of press button installation area has at least two of said plurality of first bumps, at least two of said plurality of second bumps and at least four of said plurality of microstructure patterns, and said at least two first bumps and said at least two second bumps are configured opposite to each other for assembling one of said corresponding press key structures via a first recess of said first bump and a second recess of said second bump, wherein said plurality of first bumps and second bumps are integrally formed on said light guide plate; and at least one LED light source for providing the light to enter into said light guide plate, and said microstructure patterns destructing a total reflection of said light and thus outputting said light at said press button installation area, wherein said LED light source is arranged on a short side of said light guide plate such that said light guide plate receives light emitted by said LED light source and distribute light across said press button installation area.

4. The thin backlight module of claim 3, wherein each of said plurality of first bumps has a first heightening portion and a first combining portion to form said first recess, and each of said plurality of second bumps has a second heightening portion and a second combining portion to form said second recess.

5. The thin backlight module of claim 3, further comprising a mask piece, installed at the top side of said light guide plate, and said mask piece comprising a diffusion type reflector body and a light shielding layer, and said diffusion type reflector body having a plurality of mounting holes configured to be corresponsive to said plurality of press button installation areas respectively; said light shielding layer being coated onto the upper surface of said diffusion type reflector body, a blank area being formed and included between said light shielding layer and each of said mounting holes, wherein said blank area has a light transmitting property to form a uniform bright circle around a keycap at the top of said plurality of press key structures.

6. The thin backlight module of claim 5, wherein each of said plurality of blank areas is in a square shape, and the frame width of said square shape is 0.85 mm-1.15 mm.

7. The thin backlight module of claim 5, wherein said diffusion type reflector body is a white reflector having a thickness of 0.02-0.05 mm.

8. The thin backlight module of claim 5, wherein said light shielding layer is a black ink coating.

9. A thin luminous keyboard, comprising:
a thin backlight module, further comprising:
a light guide plate, having a light output surface, a plurality of first bumps, a plurality of second bumps and a plurality of microstructure patterns, and said light output surface having a plurality of press button installation areas defined thereon, and each of said plurality of press button installation areas having at least two of said plurality of first bumps, at least two of said plurality of second bumps and at least four of said plurality of microstructure patterns disposed therein, and said at least two first bumps and said at least two second bumps being configured to be opposite to each other, wherein each of said plurality of first bumps and second bumps is integrally formed on said light guide plate; and at least one LED light source for providing the light into said light guide plate, and said light being abstracted to said press button installation areas by destructing the total reflection via said microstructure patterns;

a plurality of press key structures, configured to be corresponsive to said plurality of press button installation areas and installed on said light guide plate by articulating with a first recess of said first bump and a second recess of said second bump;

a plurality of keycaps, coupled to the top ends of said press key structures; and a bottom plate, installed to the bottom side of said thin backlight module, wherein said LED light source is arranged on a short side of said light guide plate such that said light guide plate receives light emitted by said LED light source and distribute light across said press button installation area.

10. The thin luminous keyboard of claim 9, wherein each of said plurality of press key structures has a first main body and a second main body, and the first main body and the second main body are pivotally coupled to each other, so that the center of said press key structure is enclosed to form a hollow area, and several first columns are formed on said first main body for assembling said first bump, and several second columns are formed on said second main body for assembling said second bump.

11. The thin luminous keyboard of claim 10, wherein each of said plurality of first bumps has a first heightening portion and a first combining portion to form said first recess, and each of said plurality of second bumps has a second heightening portion and a second combining portion to form said second recess.

12. The thin luminous keyboard of claim 9, further comprising a mask piece, installed at the top side of said light guide plate, and said mask piece comprising a diffusion type reflector body and a light shielding layer, and said diffusion type reflector body having a plurality of mounting holes configured to be corresponsive to said plurality of press button installation areas respectively; said light shielding layer being coated onto the upper surface of said diffusion type reflector body, a blank area being formed and included between said light shielding layer and each of said mounting holes, wherein said blank area has a light transmitting property to form a uniform bright circle around a keycap at the top of said plurality of press key structures.

13. The thin luminous keyboard according to claim 12, wherein each of said plurality of blank areas is in a square shape, and the frame width of said square shape is 0.85 mm-1.15 mm.

14. The thin luminous keyboard according to claim 12, wherein said diffusion type reflector body is a white reflector having a thickness of 0.02-0.05 mm.

15. The thin luminous keyboard according to claim 12, wherein said light shielding layer is a black ink coating.

* * * * *